US009978046B2

(12) United States Patent
Lefebvre et al.

(10) Patent No.: US 9,978,046 B2
(45) **Date of Patent: *May 22, 2018**

(54) METHOD AND APPARATUS FOR AUTOMATED BILL TIMELINE

(71) Applicant: Connexive, Inc., Los Altos, CA (US)

(72) Inventors: Martin Claude Lefebvre, Los Altos, CA (US); Lucas Wiman, Mountain View, CA (US)

(73) Assignee: Connexive, Inc., Los Altos, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/285,530

(22) Filed: May 22, 2014

(65) Prior Publication Data

US 2014/0258060 A1 Sep. 11, 2014

Related U.S. Application Data

(63) Continuation of application No. 13/661,989, filed on Oct. 26, 2012, now Pat. No. 8,738,477.

(60) Provisional application No. 61/557,908, filed on Nov. 10, 2011.

(51) Int. Cl.

| | |
|---|---|
| ***G07B 17/00*** | (2006.01) |
| ***G07F 19/00*** | (2006.01) |
| ***G06Q 20/10*** | (2012.01) |
| ***G06Q 30/04*** | (2012.01) |
| *G07F 7/10* | (2006.01) |
| *G06Q 40/00* | (2012.01) |

(52) U.S. Cl.

CPC ........... *G06Q 20/102* (2013.01); *G06Q 30/04* (2013.01)

(58) Field of Classification Search

CPC ........ G06Q 30/04; G06Q 40/12; G06Q 20/38; G06Q 20/102; G06Q 20/108; G06Q 20/085

USPC .............................................. 705/30, 33, 40

See application file for complete search history.

(56) References Cited

U.S. PATENT DOCUMENTS

| | | | | |
|---|---|---|---|---|
| 5,903,880 | A | 5/1999 | Biffar | |
| 6,578,015 | B1 * | 6/2003 | Haseltine ............. | G06Q 20/102 705/34 |
| 8,738,477 | B2 | 5/2014 | Lefebvre et al. | |
| 2002/0010666 | A1 * | 1/2002 | Wright ................... | G06Q 20/10 705/34 |
| 2002/0091829 | A1 | 7/2002 | Wood et al. | |
| 2002/0198849 | A1 | 12/2002 | Piikivi | |
| 2003/0055783 | A1 * | 3/2003 | Cataline ................. | G06Q 20/00 705/40 |
| 2003/0126047 | A1 * | 7/2003 | Hollar .................... | G06Q 30/06 705/30 |
| 2003/0191701 | A1 * | 10/2003 | Haseltine ............. | G06Q 20/102 705/34 |
| 2004/0167820 | A1 | 8/2004 | Melick et al. | |
| 2006/0230039 | A1 | 10/2006 | Shull et al. | |

(Continued)

*Primary Examiner* — Ig T An

(74) *Attorney, Agent, or Firm* — Haynes Beffel & Wolfeld LLP; Ernest J. Beffel, Jr.

(57) ABSTRACT

A computer-implemented method for displaying a plurality of bill due dates, the method comprising: displaying an account identifier for each bill in the plurality of bills; showing a timeline with a due date indicator for each bill in the plurality of bills, the timeline disposed proximate to the account identifier; and wherein each of the account identifiers and timelines are disposed along an axis relative to the other account identifiers and timelines.

19 Claims, 11 Drawing Sheets

(56) References Cited

U.S. PATENT DOCUMENTS

| | | | | |
|---|---|---|---|---|
| 2008/0249936 | A1* | 10/2008 | Miller | G06Q 20/102 705/40 |
| 2008/0288382 | A1 | 11/2008 | Smith et al. | |
| 2011/0067036 | A1 | 3/2011 | Hickford et al. | |
| 2011/0093367 | A1 | 4/2011 | Stapleton | |
| 2011/0162047 | A1 | 6/2011 | Reeves et al. | |
| 2011/0209196 | A1 | 8/2011 | Kennedy | |
| 2011/0270749 | A1* | 11/2011 | Bennett | G06Q 20/102 705/40 |
| 2013/0103580 | A1* | 4/2013 | Ventura | G06Q 40/02 705/40 |

* cited by examiner

Account Edit
Dialog 2000

Close

Edit Account

Why is this account here?

Mission Trail

Account Name:

Account Number:

003116

Account Type:

Utility

Username

Password hint

Payment Method:

Paid from Account

☐ ○ Autopay?

☐ Archive Account

Cancel    Save

METHOD AND APPARATUS FOR AUTOMATED BILL TIMELINE

RELATED CASES

This is a Continuation of U.S. application Ser. No. 13/661,989, filed 26 Oct. 2012, entitled "Method and Apparatus for Automated Bill Timeline", now U.S. Pat. No. 8,738,477, issued 27 May 2014, which is a non-provisional application of U.S. Provisional Application No. 61/557,908, filed 10 Nov. 2011, entitled "Method and Apparatus for Automated Bill Timeline".

BACKGROUND

Field

This disclosure is generally related to an inbound message management system that individuals use in order to manage communications from businesses with which they have relationships. More specifically, this disclosure is related to providing automated processing of the inbound communications to facilitate more efficient use of the communications by the individual.

Related Art

Programs and systems such as Quicken and Mint, now both owned by Intuit Inc., as well as PageOnce, can accept direct input of financial institution access credentials to allow aggregation of financial information for a household in a single place. Similarly, online bill payment systems from financial institutions such as Bank of America and USAA have provided integration with billers via direct input of individual, or household, access credentials for the bill payer's site. These tools may in turn rely on other systems such as Yodlee for interfacing with the financial institutions.

Other tools such as the Organizer product from OtherInbox can automatically analyze, prioritize and summarize emails coming into a user's inbox from institutions. Still other tools such as TripIt allow individual emails to be forwarded to a dedicated email address to facilitate presenting a single view of travel-related information.

Additionally, university research projects such as RADAR (See, e.g., "RADAR: A Personal Assistant that Learns to Reduce Email Overload," Freed, Carbonell, et al., 2008) have focused on providing virtual assistants for processing and handling email to assist in performing tasks related to those emails.

DETAILED DESCRIPTION

Overview

Figure 1:
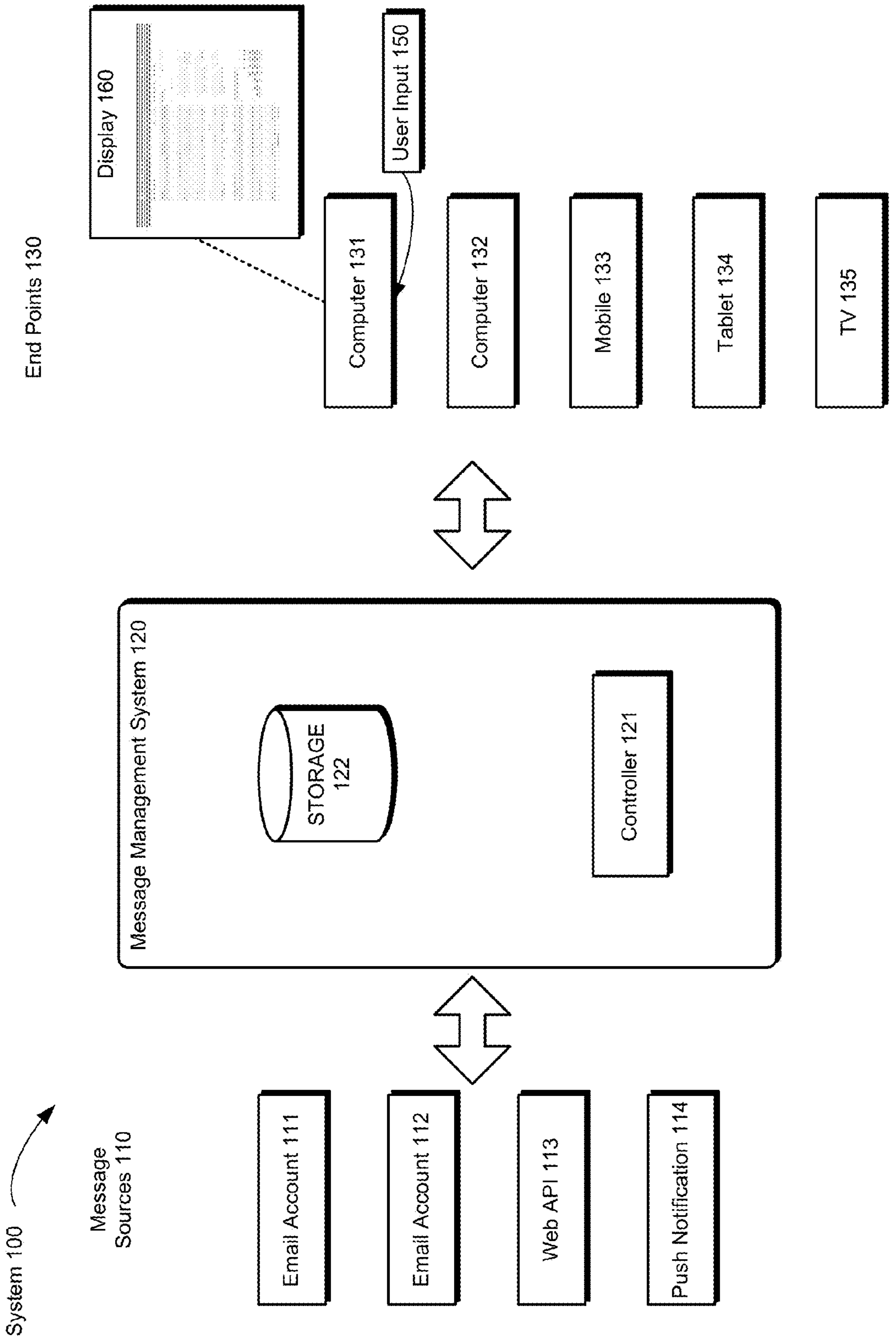
FIG. 1 shows an architectural level schematic of a system in accordance with an embodiment.

The discussion is organized as follows. First, an introduction describing some of the problems addressed by various embodiments will be presented, followed by an explanation of terminology that will be used throughout the discussion. Then, a high level description of one embodiment will be discussed at an architectural level along with a data model. Next, the user interface used by some embodiments will be discussed in conjunction with the details of algorithms used by some embodiments. Lastly, various alternative embodiments are discussed.

Let's consider the Doe household with two adults, John and Jane, and a college aged child, Sarah. The Doe household may have a wide array of relationships with financial institutions; billers such as utilities; brokerages; 401K companies; health care providers; retailers; insurance companies; and rewards programs. Information from these institutions may flow into a variety of locations: bills might primarily flow into Jane's personal email account; brokerage statements might flow into John's personal email account; travel plans for Jane's work into her work email; shopping reward credits into John's personal email; and, Sarah's debit card statements into her college email. It is desirable to provide a snapshot that encompasses more than just finances. Such a snapshot should include the wide variety of activities involved in running the Doe household.

We describe a system and various embodiments to provide a household management system with a graphical timeline display of bills. This enables a user to allow the system to automatically setup and pre-populate the system with most of the institutions they interact with without the need to laboriously manually enter the account information, and access credentials, at startup. Additionally, the system's aggregation and organization capabilities may have the effect of causing users to opt in to more notices, coupons and other messages from companies because the system will aggregate and manage the information for them effectively.

Terminology

Throughout this specification the following terms will be used:

Registered User, or User: An individual who wishes to use the service registers as a user, e.g. registered user or user. To help with enabling the aggregation of household information, each registered user can be associated with one or more system accounts. Individuals can access the system using access credentials of their selection, e.g. username/password, secure tokens, one time passwords, OAuth (including variations such as Facebook, Gmail, Yahoo, etc.), and/or other authentication approaches. Once authenticated they can access the information about the system accounts with which their user is associated.

System Account: A system account is an aggregation of information about multiple registered users, providing the foundation for a snapshot of a household. Each system account may have a primary registered user who can add or remove additional registered users' access to the system account.

Institution: An institution is an entity, such as a company, with which registered users have relationships. Examples include banks, airlines, electric companies, phone companies, brokerages, mutual fund companies, insurers, health care providers, rewards programs, stores, online retailers, and the like.

Institution Account: An institution account is a representation of a relationship between a registered user and an institution, e.g., a bank account, a brokerage account, an Amazon shopping account, a Bank of America checking account, and a frequent flyer program account. Many institution accounts have a unique number, e.g. bank account number, rewards program number, Social Security number, email address. "Account" may be used as shorthand to refer to either institution accounts or system accounts, during this discussion, and the meaning will be apparent from the usage.

Online Identity: An online identity is a set of credentials that a registered user uses to access an institution account. A single online identity may provide access to multiple institution accounts, e.g. for the Doe family, John's username/password accesses all of the Bank of America institution accounts for John's Social Security number. Similarly, a single institution account may be accessible with multiple online identities, e.g. both Jane's username/password and John's username/password can access the joint bank account.

Payment Methods: A payment method is a representation of a method for system accounts to pay bills, such as the use of credit cards, online bill pay (OLBP) services accessed via a web browser or a mobile application, debit cards, electronic fund transfer (EFTther pro) from an asset account, Paypal, pay-by-touch systems such as those that use near field communications, pay-by-mobile or cellphone, and manual payments. Payment methods facilitate use of the system account by registered users to pay institution account bills.

Message Streams: Each registered user can associate one or more inbound message streams with one or more system accounts. Once a user has established a message stream, the system imports and processes messages from known institutions. The list of known institutions is generally maintained in a master list for all users, but some embodiments may allow per-user customizations, as well as feedback provided by users of the system to update the master list. For push notifications and web APIs, relevant messages are imported.

System Overview

A system and processes to provide a household management system with a graphical timeline display of bills is described. The system will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes a system 100. The system includes message sources 110, message management system 120, and end points 130. The message sources 110 include email account 111, email account 112, web API 113, and push notification 114. The message management system 120 includes a controller 121 and storage 122. The end points 130 include computer 131, computer 132, mobile 133, tablet 134, and TV 135. Computer 131 is coupled in communication with a display 160 showing a user interface generated by the message management system 120 in accordance with one embodiment. Additionally, user input 150 to the computer 131 is shown.

The interconnection of the elements of system 100 will now be described. The message sources 110 are coupled in communication to the message management system 120 (indicated by double-headed line with arrows at end). The different sources may arrive via different mechanisms. For example, the email accounts 111-112 may be retrieved over a network, e.g. the internet, using one or more protocols, such as IMAP, POP, ActiveSync, Exchange protocol, MAPI. The web API 113 may be accessed over another network, or the same, e.g. private network, VPN, MPLS circuit, or internet, and may be any appropriate API, e.g. Yodlee, Quicken APIs, institution-specific API. Similarly, the push notification 114 may come over a network such as the internet or over an alternative network, e.g. SMS. All of the communications may be encrypted and, as appropriate, the decryption credentials may be available to the message management system 120 directly, or may be stored in storage 122 in encrypted form until additional input from an end point 130 provides the necessary decryption information, e.g. input of a decryption password from a user on an end point. Additionally a variety of authentication techniques such as username/password, OAuth, Kerberos, and more can be used for the communications. Loosely speaking, the message sources 110 can be viewed as either "pull" or "push" sources depending on how the data reached the message management system 120. For example, email account 111 might be accessed via IMAP over SSL in a pull fashion, e.g. controller 121 causes the email account 111 to be polled periodically and new messages retrieved. In contrast, email account 112 might be accessed via ActiveSync in a push fashion, e.g. the email account 112 notifies the controller 121 when new messages are available, optionally pushing them to the controller 121.

Controller 121 and storage 122 can be composed of one or more computers and computer systems coupled in communication with one another. They can also be one or more virtual computing and/or storage resources. For example, controller 121 may be an Amazon EC2 instance and the storage 122 an Amazon S3 storage. Other computing-as-service platforms such as Force.com from Salesforce, Rackspace, or Heroku could be used rather than implementing the message management system 120 on direct physical computers or traditional virtual machines. Communications between the potentially geographically distributed computing and storage resources comprising the message management system 120 are not shown.

The end points 130 are similarly coupled in communication to the message management system 120 (indicated by double-headed line with arrows at end). This communication is generally over a network such as the internet, inclusive of the mobile internet via protocols such as EDGE, 3G, LTE, WiFi, and WiMax. The end points 130 may communicate with the message management system 120 using HTTP/HTTPS protocols and may be implemented in one embodiment using a web interface or application to enable easy support of a range of end point device types. The mobile 133 can be any mobile device with suitable data capabilities and a user interface, e.g. iPhone, Android phone, Windows phone, Blackberry. The tablet 134 can be any tablet computing device, e.g. iPad, iPod Touch, Android tablet, Blackberry tablet. The TV 135 can be a TV with built in web support, for example Boxee, Plex or Google TV built in, or can be a TV in conjunction with an additional device (not shown and often referred to as a set-top box) such as a Google TV, Boxee, Plex, Apple TV, or the like. According to some embodiments, the end points 130 are any web-enabled device supporting reasonable full HTML rendering, and the feature set available on a device may be limited depending on the HTML rendering capabilities. In other embodiments, a custom, or native, user interface is prepared for the device, e.g. a device with a more limited web browser but a native widget set might receive a custom application. Similarly, some recent mobile devices, tablet devices, and TVs support an "application store" concept and custom applications could be targeted at such embodiments. In certain situations, the environment may be executing remotely and rendered on the TV, e.g. cable headed computers execute the application and cause the display to be rendered and process user inputs passed back over the system. The display 160 is coupled in communication with the computer 131 and the computer 131 is capable of receiving user input 150, e.g. via keyboard, mouse, track-pad, touch gestures (optionally on display 160).

The communication is often bidirectional with the end points 130 directly making requests to the message management system 120 and the message management system 120 directly making requests to the message sources 110.

Figure 2:
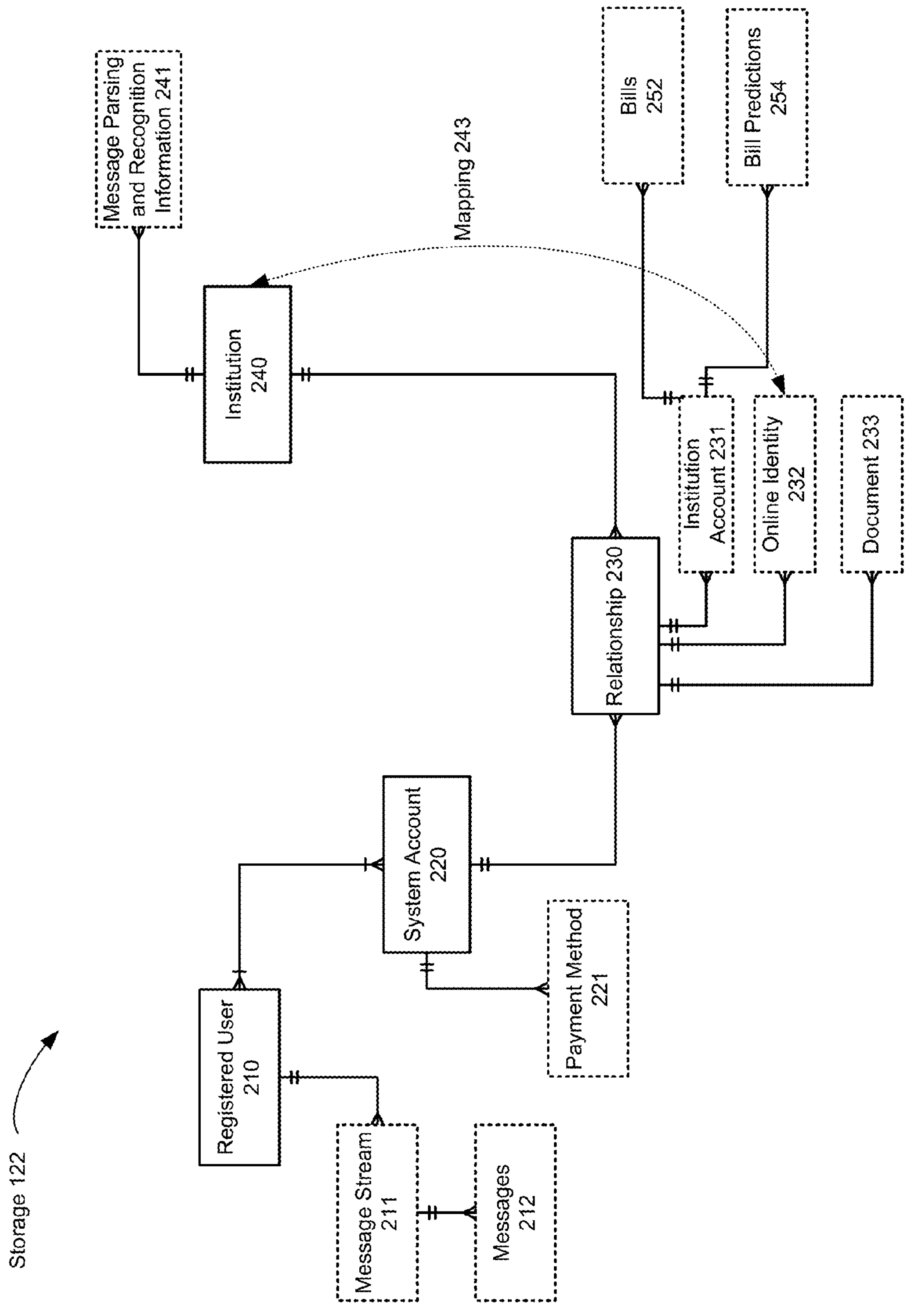
FIG. 2 shows a high level view of the data model of a system in accordance with an embodiment.

Having described the elements of FIG. 1 and their interconnections, the system will be described in greater detail in conjunction with FIG. 2, showing a high level view of the data model of a system in accordance with an embodiment.

FIG. 2 shows the relationship between registered users 210, system accounts 220, relationships 230, and institutions 240. The lines between these boxes, together with the notations at the line ends, describe the cardinality of the relationships, e.g. each registered user 210 is related to one or more system accounts 220; each system account 220 is associated with many relationships 230, but each relationship 230 is associated with exactly one system account 220. The singular and the plural are used interchangeably in discussing the elements of FIG. 2 for clarity to better focus on describing the data model which the diagram clearly describes. Dotted boxes are used to highlight additional types of associated data in the data model, e.g. message streams 211, messages 212, payment methods 221, institution accounts 231, online identities 232, documents 233, and message parsing and recognition information 241. Additionally, not shown, a mapping 243 is maintained between online identities 232 and institutions 240. In one embodiment, the messages 212 in the message stream 211 can be analyzed to identify bills 252 which can be associated with an institution account 231. Additionally, manually entered bills can be stored with the bills 252 in some embodiments. Bill predictions 254, is used by some embodiments to track anticipated bills. In some embodiments, the bills 252 and the bill predictions 254 are stored as a single object with additional data indicating whether the item is an actual vs. predicted bill as well as whether the bill was entered manually or if it corresponds to a message in messages 212.

In one embodiment, adding a manual bill may create a private, relative to other users, institution, e.g. in institution 240, as well as an institution account 231. These private institutions can be tracked by the operator of the system 120 to identify potential additional institutions to identify from messages. For example, if a meaningful number of users all have XYZ utility bills, then the XYZ utility might be made into a public institution with appropriate message parsing and recognition information 241 added. Additionally, some embodiments may allow registered users 210 to submit messages 212 to the system 120 for specific processing, e.g. the system did not detect institution XYZ, but the user wants messages from that institution identified. Submitting such a message may in such an embodiment trigger the creation of a new institution and the generation (automatically or with human intervention) of one or more rules to be added to message parsing and recognition information 241 for automatically handling those messages going forward. Such additional parsing and recognition capability can be kept private to the user who requested it, or alternatively, in one embodiment, can be added as additional rules that will benefit other users of the system as well.

Additionally, in some embodiments receipt of a bill into bills 252 may trigger automatic creation of one or more entries in an accounting system linked to the system account 220 (not shown). For example, one receipt of a bill entries in Quickbooks could be automatically created to record the receipt of the bill. For businesses, this feature may reduce book keeping costs and improve accounting processes.

FIG. 2 is only one possible data model used by an embodiment; other data models may be used. It should be understood that the data model in FIG. 2 can be implemented in one or more databases, object relational mapping (ORM) systems, and/or any other appropriate data storage. If a SQL-style database is used, each box loosely corresponds to a table with rows of the tables containing the appropriate contents. For example, the registered users 210 could be stored as a table with one row per registered user, and an intermediate table would be used to connect the registered user table with the system accounts table to support the many-to-many relationship. In other data storage approaches, intermediate tables might not be required, and for that reason such intermediate, or join tables, are omitted from the data model of FIG. 2. The data and data model of FIG. 2 can be stored in the storage 122 and managed by the controller 121.

The storage 122 includes both institution data and user data. The institution data can include email domain names and addresses (institutional whitelist), as well as a collection of rules used to analyze emails originating from that institution. The user data can include a list of business relationships associated with each system account. Each relationship 230 can include the name of the institution, a list of institution accounts 231 that the registered users associated with that system account have established with that institution, online identities 232, and documents 233. In this embodiment, payment methods 221 can be associated with system accounts 220. This can facilitate easier bill payment, e.g. you usually pay your phone bill with your Bank X Credit Card.

Additionally, the information about institutions 240 can include information to handle proxy delivery services. Example #1: Schwab and other brokerages use a service to send out certain proxy materials. Emails come from id@proxyvote.com. Emails received from proxyvote.com can be associated with the original institution (in this case Schwab) and processed as such. Ultimately, actions can be proposed and/or taken with respect to these email, helping manage that user's household. Example #2: Bank of America offers a service called e-bills. Users of the service receive notices from Bank of America when their bills come due. These notices can be associated back to the appropriate billing institution to make sense to the end user. Such linkages can use a mixture of account information from the proxied emails, as well as optional manual corrections and/or adjustments by registered users.

Returning to the description of the system 100, we will focus on the initial setup and first use of the example Doe household of John, Jane and their college aged child, Sarah to motivate the operation of the system. A household member, Jane, connects to the system 100 via an end point 130 such as computer 131 using a web browser, e.g. Chrome, Firefox, Internet Explorer, or Safari, and becomes a registered user. Once registered, Jane establishes the Doe Family system account. This information is stored by the controller 121 in the storage 122. Next, Jane provides login information for one message source 110, e.g. her personal GMail email account, email account 111. The controller 121 can then access the email account 111 and begin to automatically identify the household's institution accounts, discussed in greater detail below, and create a dashboard for the household. Later, John can become a registered user and associate his message streams, e.g. email accounts, with the Doe Family system account. Additionally, the parents can create a second system account for their college aged child, Sarah, e.g. "Sarah's Accounts," which both they and she can monitor.

Throughout this example, computer 131 will be used as the endpoint 130 and the users can view the output of the system on the display 160 and can interact with system by providing user input 150 to the computer 131. That user input 150 may be communicated by the computer 131 to the message management system 120 to eventually cause an update to the display 160.

As shown in FIG. 2, the contents of the messages can be stored in the message stream 211 associated with a specific registered user 210. This provides the system account, or Doe Family in this example, access to the messages without requiring sharing, among household members, of passwords or access credentials.

Additionally, display settings for the underlying messages may be available in some embodiments. In one embodiment three display settings are available for each message: joint, shared or private. This information is used, along with message ownership information, to control the display of objects in the user interface:

- Joint—all registered users of the system account have equal control and access to all the information (emails and documents) that is not segregated by user.
- Shared—all registered users see the information in their dashboards, but only the message recipient can control the display status.
- Private—only the registered user to whom the message was directed can view the message in their user interface.

The specific display settings can be varied in different embodiments. It is valuable to have default display settings for different message types and/or institution type that can then be further customized by users. The display settings serve to limit clutter and thus better manage users' attention budgets. In some embodiments, the settings may also serve a security function.

For "pull" oriented message sources 110, the message management system 120 may periodically access the message sources 110 to obtain new information. The polling rate may be set automatically by the system and, in some instances, may be further customized by registered users, e.g. check my email every 15 minutes. During the pull process, relevant messages are imported into the message stream 211 for that registered user 210. See below for further discussion of email processing. For "push" oriented message sources 110, the message management system 120 can respond to push notifications by storing relevant messages into the message stream.

The message management system 120 processes the message streams 211 for a system account 220 to create a unified dashboard that can be viewed on the end points 130. One or more types of summarized versions of the message may be created for each original message according to one embodiment: alerts and snaplets.

Alerts can be used to represent certain messages in displays on end points 130. Alerts are used for displaying important information in messages in a way that allows the end user to review their message contents without navigating to each message and having to click/touch through each one. In some embodiments, alerts can be used for messages that contain account activity information that generally does not require follow up. Examples could include: welcome messages, password changed, new biller created, account activity, new PIN confirmed, deposit posted, periodic summaries, bill reminders, proxy materials, many travel related messages, stock quotes, stock alerts, and social network notifications (e.g., Facebook, Twitter, LinkedIn notifications). In some embodiments, social network notifications are separately categorized from other types of alerts. In contrast, in some embodiments, snaplets require user action to complete a task, e.g. pay a bill that is due, complete a purchase such as a Groupon coupon, vote proxy materials, obtain a document, renew driver's license/registration/prescription. Additionally, snaplets can be more heavily formatted to extract key actionable data such as amounts/due dates, whereas alerts may retain the original text, while stripping out formatting and boilerplate to enable easy scanning A snaplet is a text or media message transformed and/or extracted into formatted data with fields specifically extracted from the message. The extracted fields are system defined for a given message type. A snaplet is formatted by identifying a relevant message, extracting key information for that type of message and storing it in a structured format. An alert is a text or media message transformed and/or extracted into text with most formatting and boilerplate removed either by summarizing the original message or extracting key textual elements.

Some sample alerts are shown here:

Example Alert #1:
Chase: Your Daily Account Summary
From Chase 02/12/2010 '4567
End of day balance: $2,164.61
Total deposits: $ 0.00
Total withdrawals: $ 0.0

Example Alert #2:
Chase: Your Set Transaction Amount
Exceeded Alert From Chase Card Services
02/11/2010 1234
A transaction exceeded ($ USD) 1.00.

Example Alert #3:
Chase: Your ATM Withdrawal 02/11/2010 '4567
A $120.00 ATM withdrawal exceeded your
$100.00 Alert limit.

As you can see, this format for messages is suitable for easy scanning or swiping on a touch device without the need to manually providing input to go from message to message. Consider some snaplets in contrast; the fields from each snaplet enable easy composition into a single line actionable representation of the underlying message on end points 130:

PAYMENT CalWater '1234 $113.14 Due: 02/22/10
PAYMENT PG&E '29-6 $731.48 Due: 03/01/2010
CHECKIN Southwest SFO-LAX 2:15 pm On: 02/14/10
DOWNLOAD MorganStanley '3456 Sent: 02/18/10

These samples highlight the value of snaplets because they indicate a clear action for the user to take with a specific account. Like alerts, snaplets are designed for easy scanning; however, a higher degree of reformatting has pulled the most crucial information out. Additionally, the bold faced text may be a link, or button, to launch task assistance, discussed below, for easily completing the snaplet's required action.

In summary, the architecture of system 100 and the components and mechanisms through which it affords an easy way to provide a household management system with a graphical timeline display of bills. In another embodiment, the graphical timeline can be understood as a visualization of the snaplets for billing. Additional aspects of the system will be described in greater detail with reference to the sample user interface screens and process flow diagrams in the subsequent figures.

User Interface

The system, in accordance with an embodiment, will be discussed with reference to FIGS. 3-10 showing the user interface of one embodiment. These user interfaces could be displayed on the display 160 coupled to computer 131 or other displays associated with other end points 130. All of the user interface figures are shown without browser or operating system user interface elements for simplicity.

Figure 3:
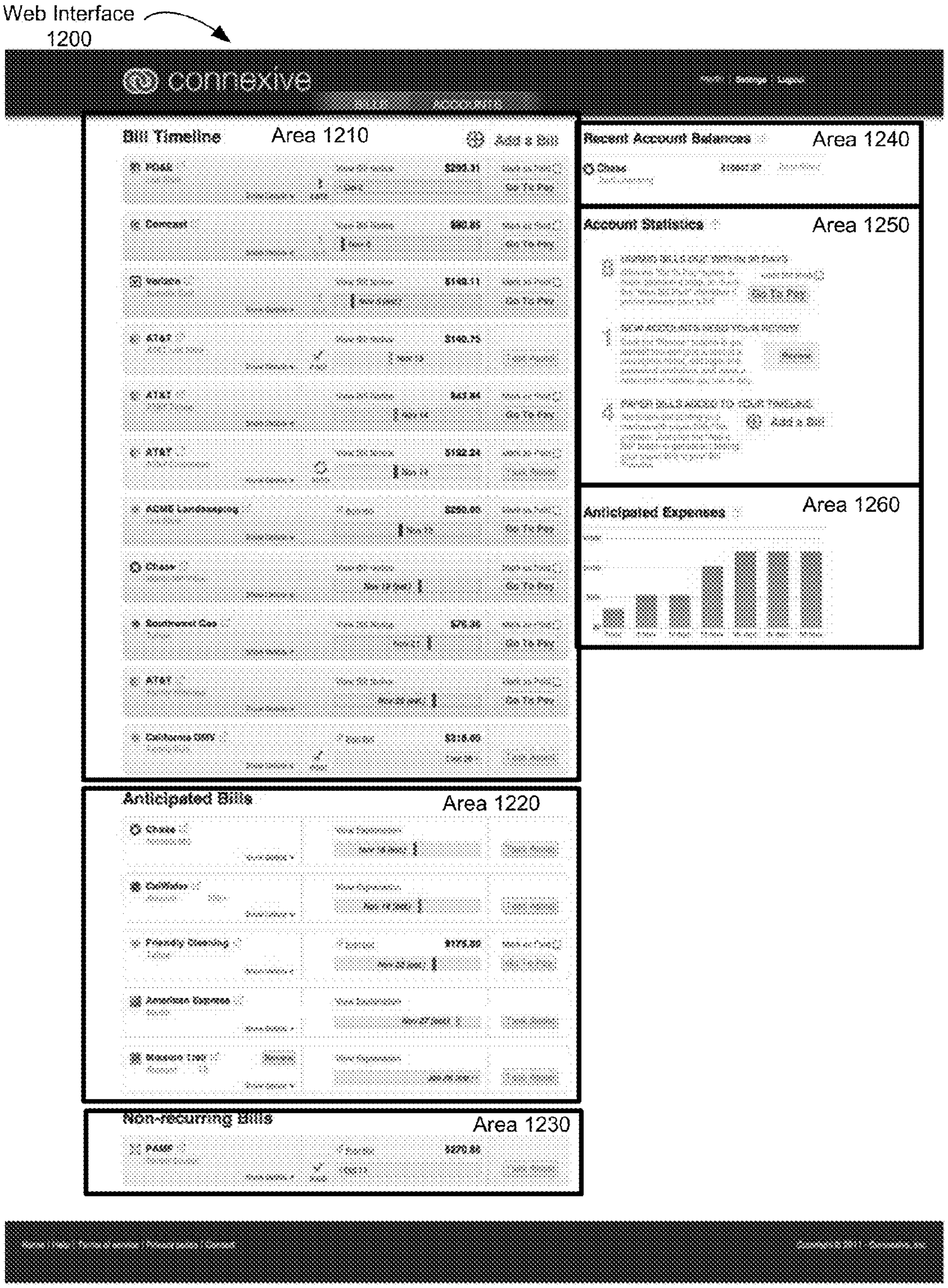
FIG. 3 shows a user interface for an embodiment.

FIG. 3 shows a user interface for one embodiment of the system. One useful feature of this user interface is every known bill for the registered user, or system account, is shown in a single time-organized view within areas 1210-1230. Specifically, both paid and unpaid actual bills are included (area 1210), anticipated bills (area 1220) as well as less regular, or non-recurring, bills for the time period are all in one user interface. Further, within each area, the bills are organized by date, e.g. next due bill first and most distant due bill at the bottom. The shown grouping is just one embodiment, other embodiments might mix categories of bills and use other notations to delineate between actual versus anticipated bills.

Notably, this user interface has a visual indication of the due dates (see timelines 1360 on FIG. 4 for a more detailed view) that is not "stacked up" on a single timeline. But, because the user interface in one embodiment focuses on one month of bills, the timelines provide a good visual indication of the timing of bill payments. Additionally, while the user interface of FIG. 3 is targeted for a web browser associated with a computer, e.g. display 160 on computer 131, the same basic approach can be applied to other end points 130 and their associated displays for providing a better timeline for bills.

The features and functionalities of the web interface 1200 and the various areas 1210-1260 of the web interface will be described in greater detail in connection with FIGS. 4-7.

Figure 4:
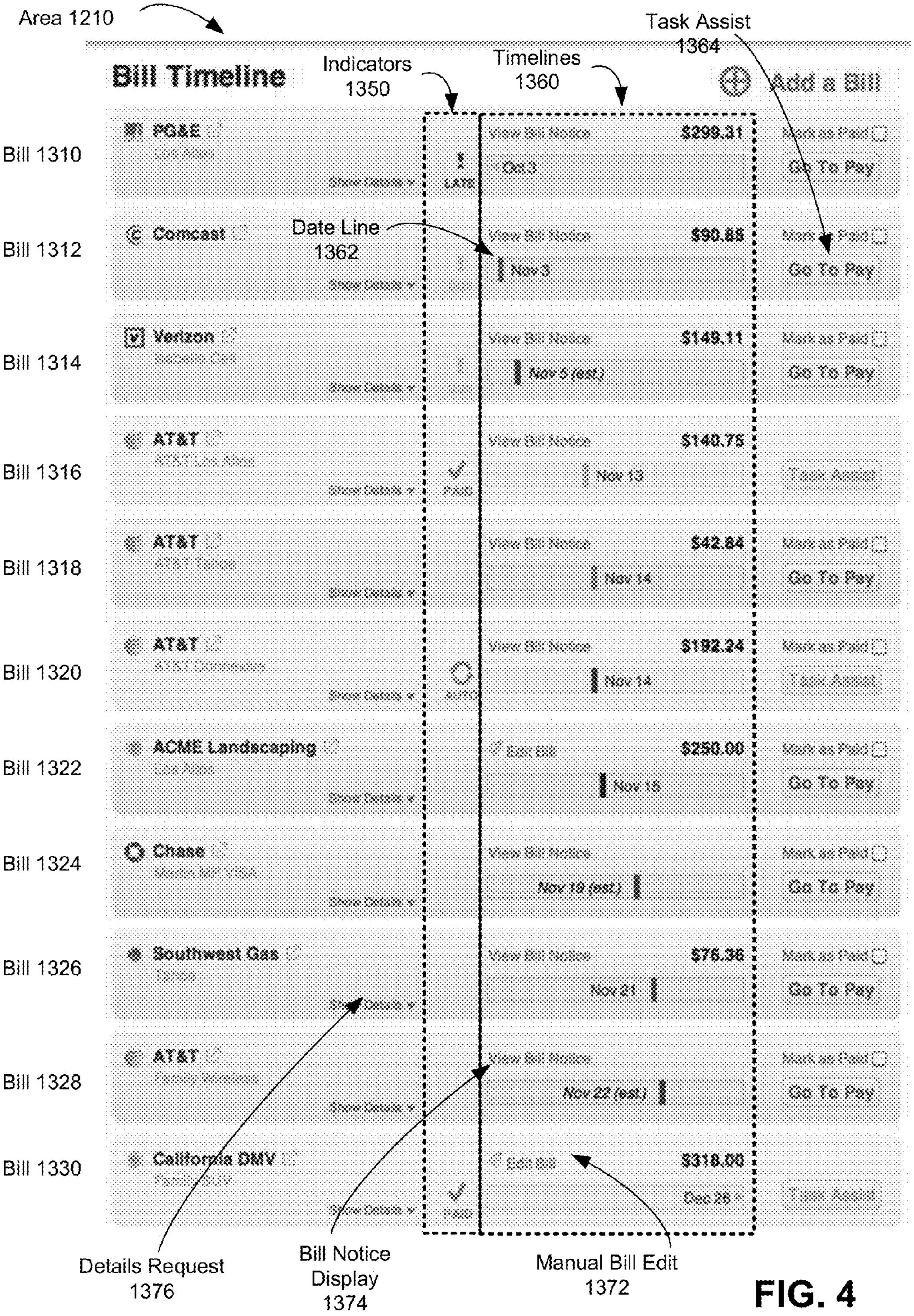
FIG. 4 shows a user interface for the bills timeline for an embodiment.

FIG. 4 shows a user interface for the bills timeline for an embodiment. Specifically, area 1210 of FIG. 3 is shown in greater detail. Notably for each bill (bills 1310, 1312, 1314, 1416, 1318, 1320, 1322, 1324, 1326, 1328 and 1330), an account identifier is shown (e.g. icon of biller, biller name, user assigned nickname, and/or partial or complete account number) together with a timeline (from timelines 1360) proximate to the account identifier. Additionally, some embodiments may include explicit indication of whether the bill is an e-bill, mail, or paper in the account section. In the shown embodiment, a background box is included to visually group information about a single bill cohesively. Additionally, in this embodiment, the color of the box indicates the payment status grey for paid bills (e.g. bill 1316, bill 1320, and bill 1330) and blue for unpaid bills. This helps focus user attention on the actions required while still providing information about all bills in one place. For each bill an optional indicator (indicators 1350) is shown that reflects the payment status with an icon according to one embodiment, e.g. late, paid, due (within 7 days), automatic payment set, scheduled (optionally with date of payment), and alert for missing bill (anticipated bill has not been received within some predetermined expectation tolerance, e.g. +/−4 days). Within each timeline in timelines 1360, a date line is shown, e.g. date line 1362 for the timeline associated with bill 1312. The date line helps visually position the bill within the entire time period covered by the display. In one embodiment, the default display covers one month, e.g. 30-31 days.

In the shown embodiment, the date lines are focused on providing date information relative to other bills. However, other embodiments, may encode additional information in the date line using color, shape, height, and/or other differentiating characteristics. For example, the amount of the bill relative to other bills in the report might be indicated by the height of the date line. Bills that fall outside of the standard amount for that account might be in a different color to draw the user's attention.

For unpaid bills, task assistance is available via user input on task assist 1364. See U.S. Provisional Patent Application 61/434,508 (entitled "Method and Apparatus for Inbound Message Management" assigned to Connexive, Inc. and having Martin Lefebvre as the first inventor) for one implementation of task assistance. For automatically identified bills, the underlying message(s) that caused the bill entry to be created can be viewed via user input on bill notice display 1374. This can overlay a dialog box/display on the web interface 1200 to enable review of the message(s). More generally, in instances where a dialog box or display is referred to, embodiments could navigate to another browser tab or browser window. For manual bills, user input on manual bill edit 1372 can enable the user to modify aspects of the manually entered bill. Additionally, for any bill entry, details can be requested via user input on the details request 1376.

Figure 5:
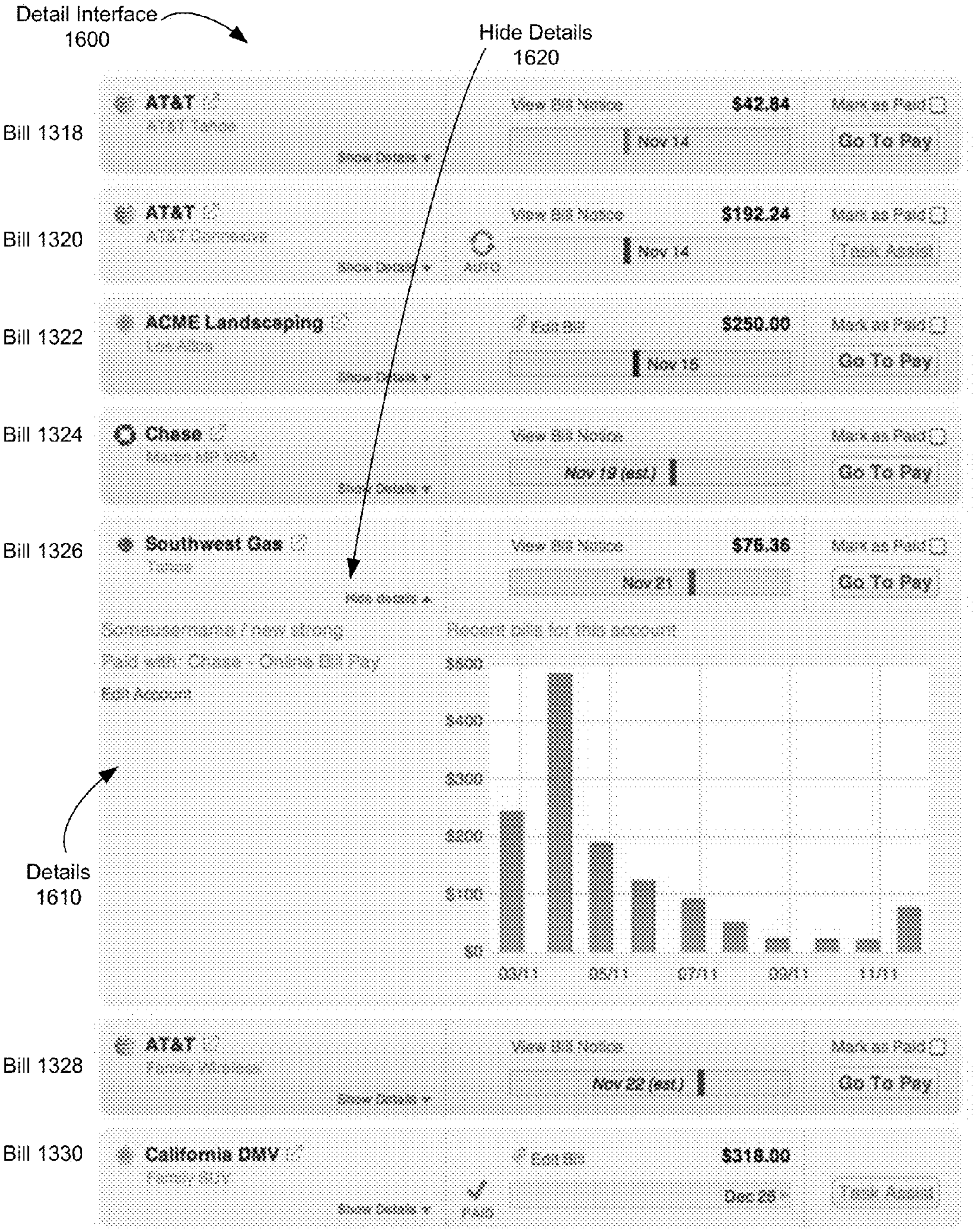
FIG. 5 shows a user interface for the details view for an embodiment

FIG. 5 shows a user interface for the details view for an embodiment, specifically detail interface 1600 shows the details 1610 for bill 1326. There is also a hide details link 1620 to hide the details. The details include additional information about the institution, institution account and/or bill. In one embodiment this includes billing history, e.g. text or graph (shown), payment account, billing institution web site information (username/password hint). Other embodiments may include additional information. For example, the details area might include affiliate, or general, marketing such as incentives by the institution to switch to paperless billing and/or automatic payment. Other uses of the space might include recommending alternative (cheaper) providers of similar services, e.g. "Consider switching to Verizon". In other embodiments, advertising may be displayed elsewhere in the web interface 1200.

Returning to FIG. 4, the display in area 1210 is blending primarily automatically identified information with manual information of two kinds: (a) manually entered bills and (b) manually supplemented details that were missing (e.g. payment amounts and/or due dates) that can sometimes be missing from a message from a billing institution and which the system 120 may also attempt to estimate. For example, several of the due dates in the timeline include estimates, e.g. bill 1328 has the November 22 due date estimated.

Figure 6:
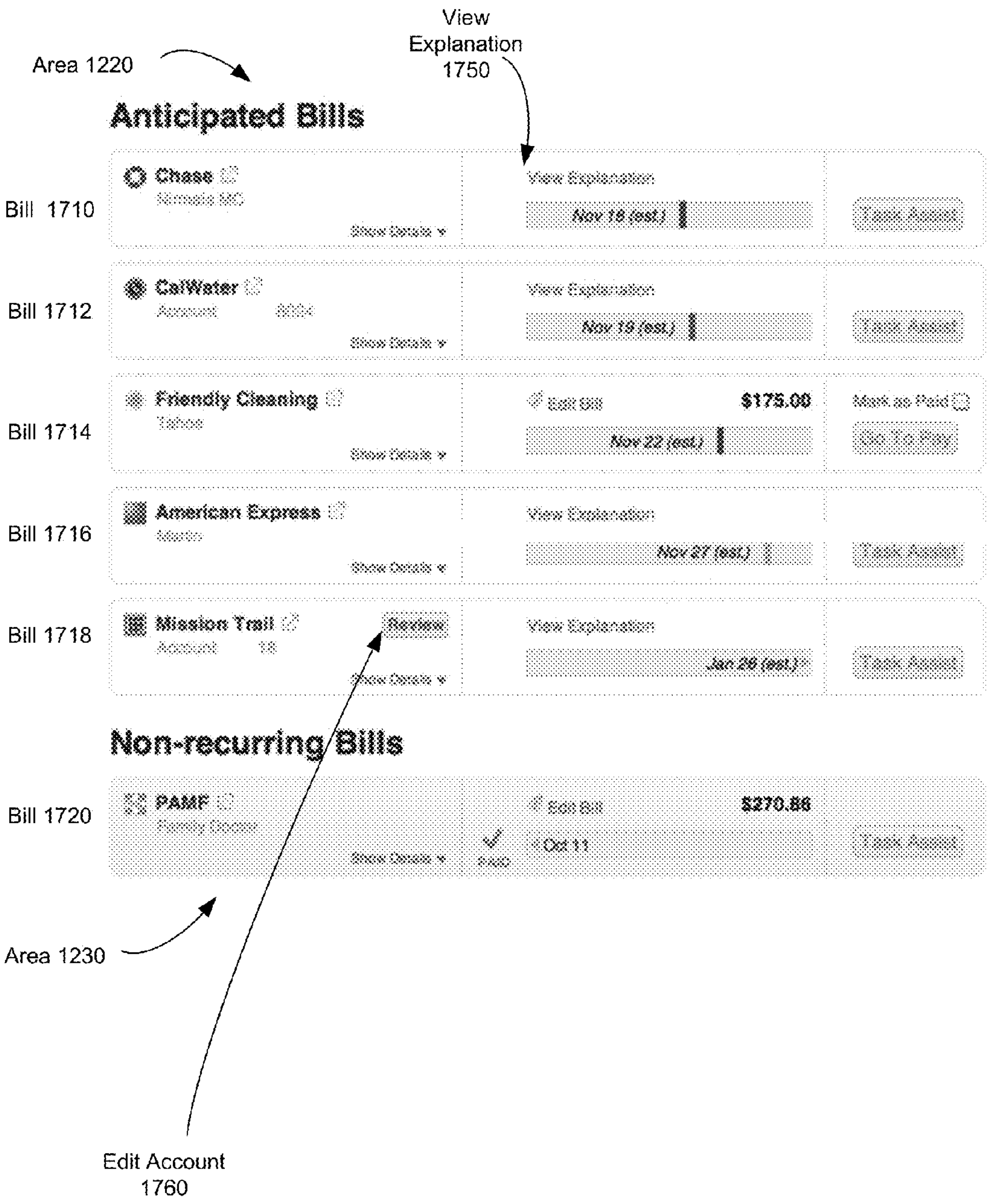
FIG. 6 shows a user interface for the anticipated and non-recurring bills timeline for an embodiment.

FIG. 6 shows a user interface for the anticipated and non-recurring bills timeline for an embodiment, among the bills shown in FIG. 6 are bills 1710, 1712, 1714, 1716, 1718 and 1720. Specifically, the areas 1220 and 1230 of FIG. 3 are shown in greater detail. A similar display set up as was described in connection with bills for FIG. 4 is used in both areas with an account identifier proximate to a timeline.

Notably in FIG. 6, anticipated bills can be reviewed by the user, e.g. user input on view explanation 1750 to trigger human understandable information such as dialog 1900 (see FIG. 8), explaining why a bill is anticipated. Additionally shown in this figure is a mechanism for user input to edit accounts via user input on edit account 1760. In one embodiment, when the system 120 identifies the first bill from a billing institution, the "Review" user input point is shown to encourage users to provide additional context about the account, e.g. nicknames, account numbers, payment methods, etc.

In one embodiment, a cutoff of 18 days is used to determine which anticipated bills to show in the anticipated bill section. Note that as discussed supra, in some embodiments this cutoff may be used for only certain types of anticipated bills. Bills that are anticipated between 19-30 (or 31) days that would otherwise, normally be reflected in the report are filtered out. This helps remove clutter and or double-entries of bills from the display. For example, bill 1316 for an AT&T phone service would be confusing if it appeared both in the actual bill section (area 1210) as well as in the anticipated bill section. A cutoff of 18 days forward look helps reduce clutter by filtering out the next anticipated bill while the current bill is on the display. Other embodiments might perform filtering using a de-duplication rule as opposed to a date-based cutoff Additionally, the particular grouping of bills into these three categories of actual, anticipated and non-recurring can be user and/or system customizable. More generally, the horizontal (or potentially vertical) display of the different bills with separate timelines offers users an improved comprehension of bills versus a single timeline. In one embodiment there are two types of anticipated bills: (i) those anticipated from the message stream, e.g. crystal ball bills, see discussion of FIG. 11, and (ii) manually entered bills. For crystal ball bills, an anticipated bill is moved to the timeline when a bill notification message is received. If a bill is not received within a certain tolerance window (say 7 days) of the anticipated date, a flag can be raised using a suitable indicator in the anticipated bill area 1220 as one done with indicators 1350 for area 1210 as discussed in connection with FIG. 4. An indicator can alert a user that an anticipated bill has not been received. For manually entered bills, in one embodiment, the bills are moved into the main timeline eighteen (18) days before the due date. This timing may be particularly helpful because it may correspond with when the underlying paper bill would be received.

Figure 7:
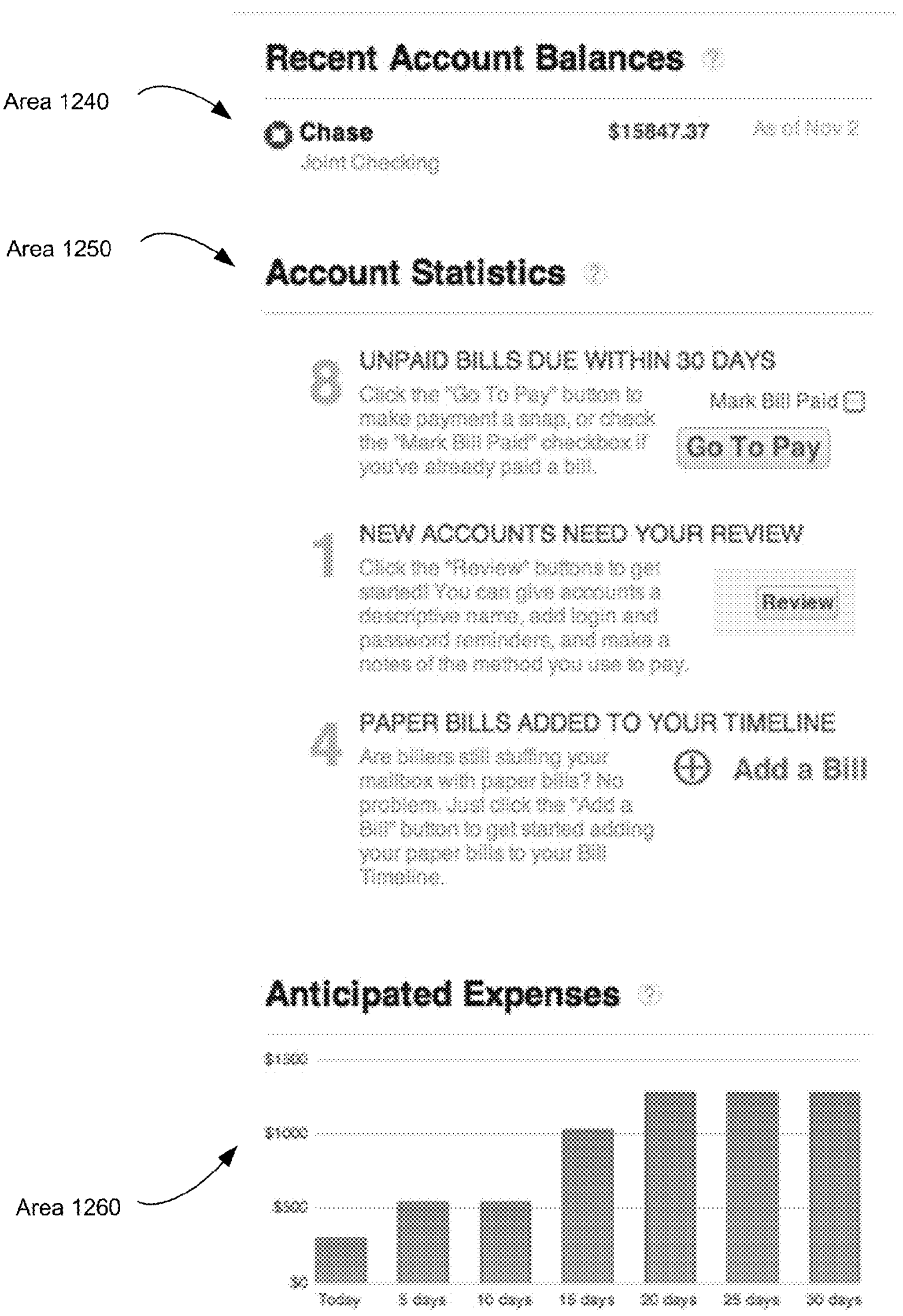
FIG. 7 shows a user interface for an embodiment.

FIG. 7 shows a user interface for an embodiment, the areas 1240-1260 of FIG. 3 are shown in greater detail. Area 1240 provides a summary of recent account balances for the payment accounts used to pay bills. The information about the balances can be extracted from messages and/or directly obtained from financial institutions. In area 1250, a summary of the timeline in narrative form is shown. In this embodiment, the number of unpaid due bills is summarized, the number of new accounts where manual supplemental input can improve results is shown (e.g. adding a nickname for an account and/or clarifying the computer recognized date). In some embodiments, some or all of the buttons in area 1250 are active, e.g. user input on "Go to Pay" would start a task assist process for paying the nearest in time unpaid bill. In the example of FIG. 3, this would be the bill 1310, a late bill for PG&E.

Area 1260 shows a chart of anticipated expenses over the period of the timeline, e.g. 30 days. So in this example, you can see about $1,300 worth of bills are due over the next 30 days. In some embodiments, area 1260 might be expanded to include income and expected account balance information. Income information can be obtained from messages about direct deposits (wages, social security, etc.) and/or directly from financial institutions. Additionally, anticipated payments could be included. Thus in one embodiment you could see at a glance your cash position forecast for the timeline period at an easy glance. This would highlight periods when the user might not have enough cash to meet all of their obligations.

Figure 8:
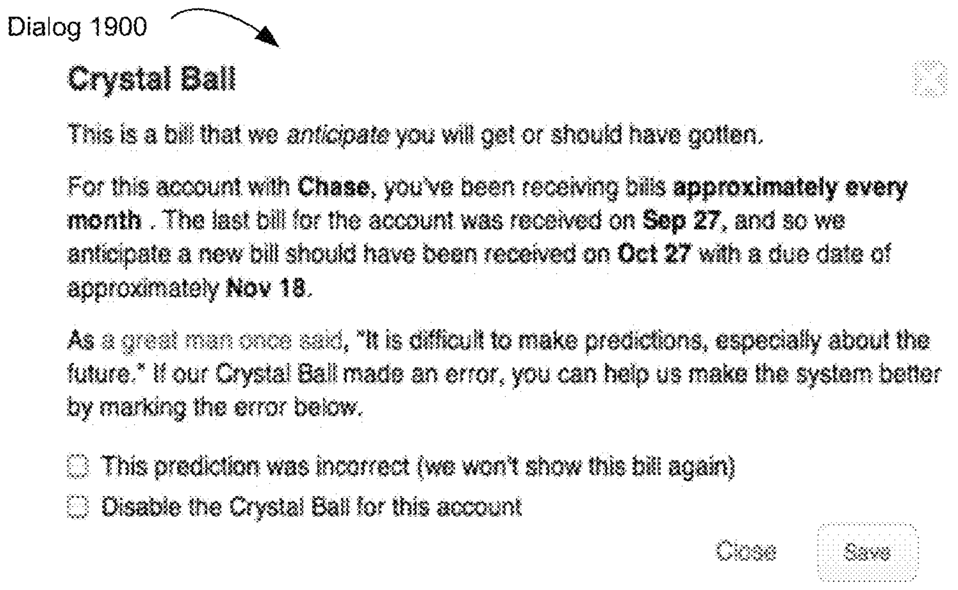
FIG. 8 shows a user interface for an explanation of an anticipated bill for an embodiment.

FIG. 8 shows a user interface for an explanation of an anticipated bill for an embodiment. As discussed previously, the dialog 1900 could be shown to explain an anticipated bill to a user in human understandable terms upon user input on view explanation 1750 of FIG. 6.

Figure 9:
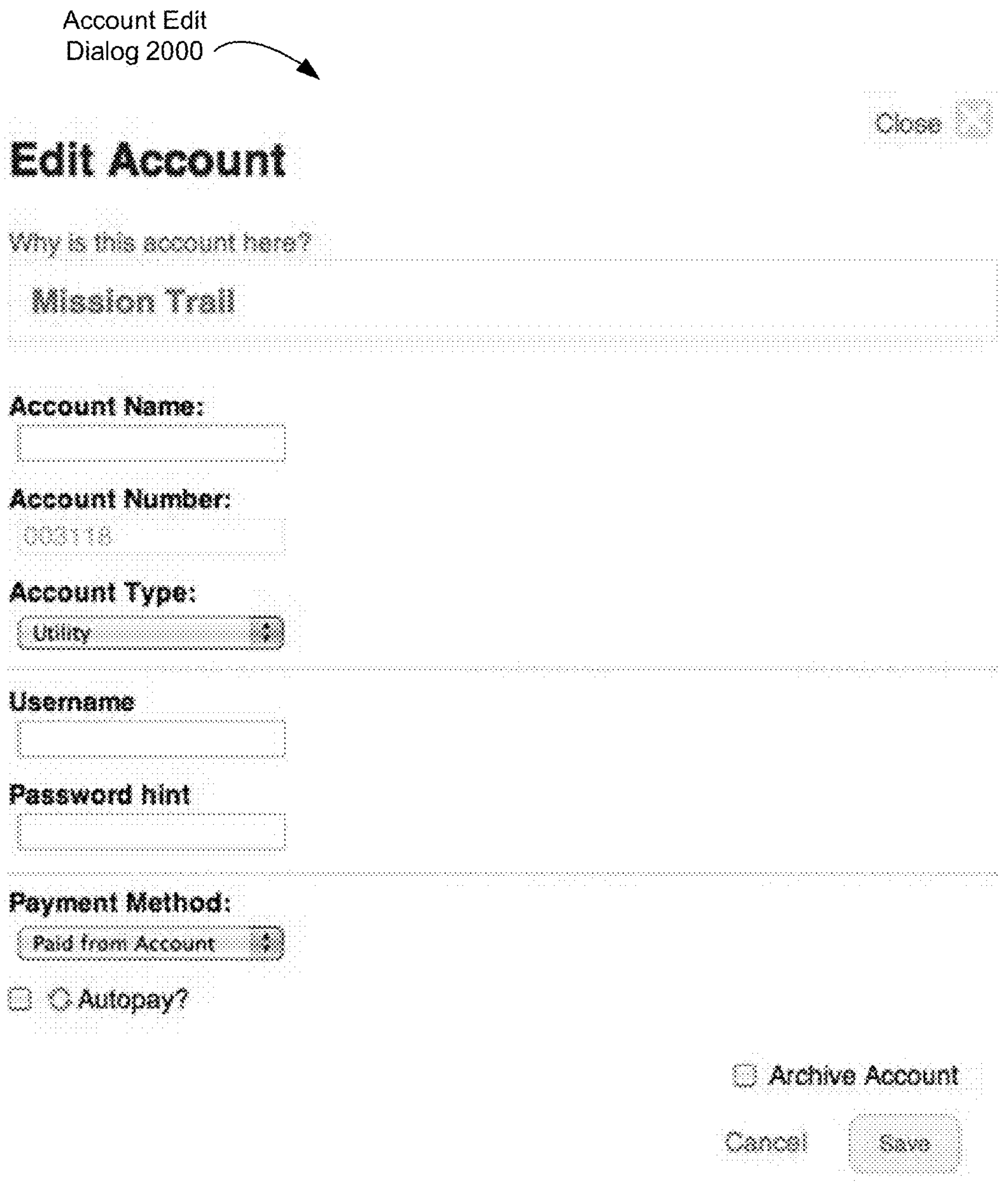
FIG. 9 shows a user interface for editing an account for an embodiment.

FIG. 9 shows the edit account dialog 2000, this allows for user supplementation of the automatically identified information. For example, accounts can be assigned nicknames. This dialog can be displayed overlaid on the screen in response to user input on the edit account 1760 button of FIG. 6. In one embodiment, the data that can be provided includes account name (or nickname); account number (or account identifier); account type, e.g. utility, loan, credit card; username; password hint; payment method; and/or autopay indicator. In some embodiments the system imposes some limits on the user's ability to add and/or modify account numbers. For example, in the case of utility accounts, the system may allow the user to enter the complete account number for ease of reference without allowing him and/or her to modify the trailing numbers that were automatically extracted from an email or other data source as this could create difficulties for automatic message identification. As another example, in the case of credit card accounts and/or other financial accounts, the system may prevent users from entering a complete account number as this may pose a potential security risk to such users.

Figure 10:
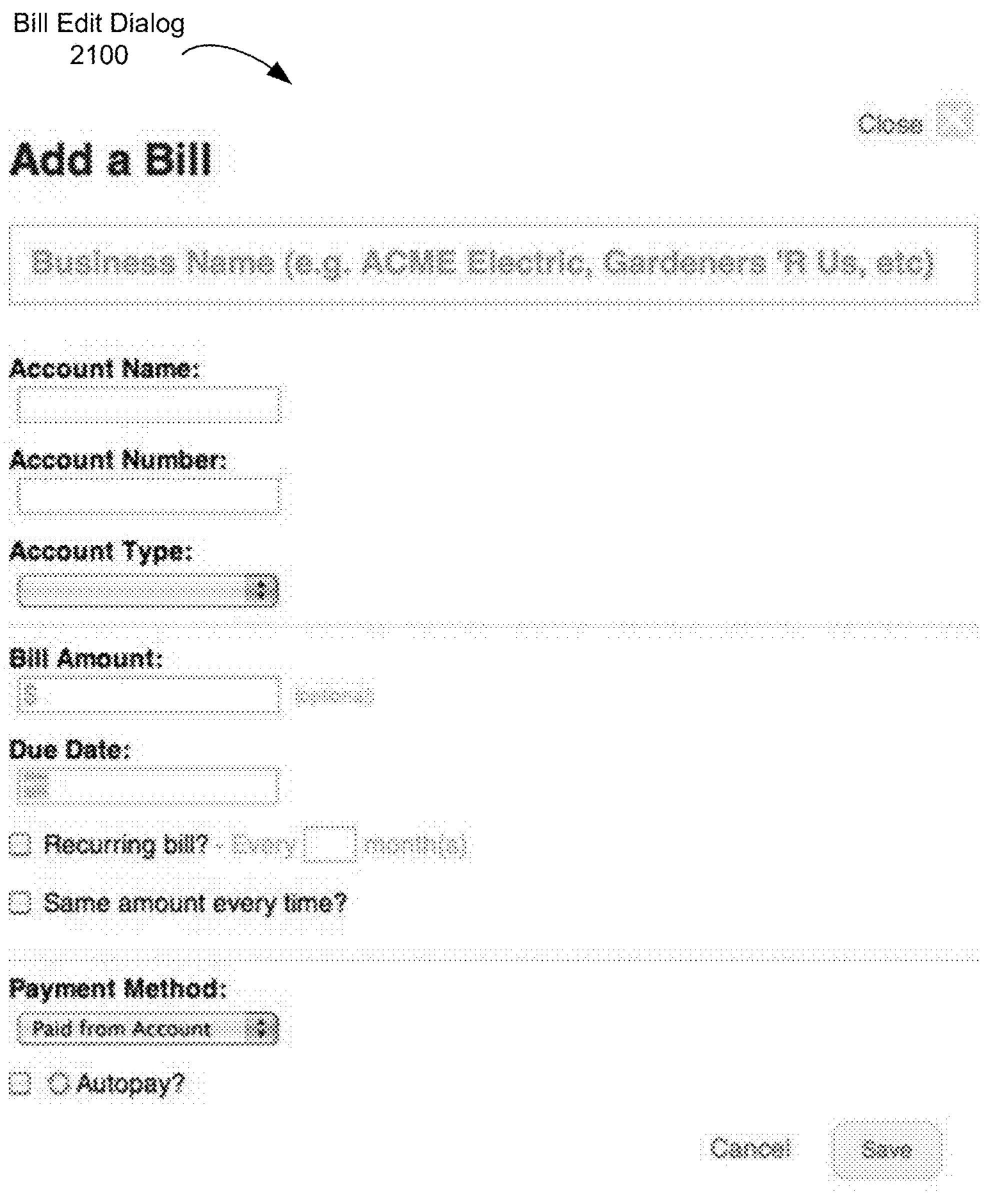
FIG. 10 shows a user interface for adding a bill for an embodiment.

FIG. 10 shows the bill edit dialog 2100 and can be displayed (blank as shown) in response to a user input on "add a bill" or partially completed in response to user input on the manual bill edit 1372 button of FIG. 4. As discussed supra, creation of a bill will create (or be linked to) one or more institution accounts and institutions. This creation of accounts and institutions can occur automatically in the background without direct user input. Note that the process of creating a bill, FIG. 10, has similar inputs to the account edit dialog, FIG. 9, as well as specific fields to allow the user to input the specific bill amount, due date, and recurrence (with option to specific the recurrence).

The use of the term dialog in relation to FIGS. 8-10 refers to input mechanisms as opposed to the mandatory use of an operating system dialog box. In one embodiment, the dialogs are displayed by overlaying a part of the browser window to focus the user in the specific input area.

Message Acquisition and Processing

Figure 11:
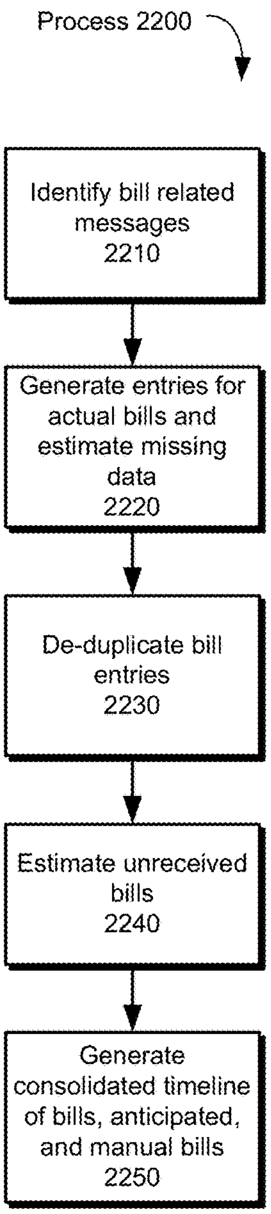
FIG. 11 is a process flow diagram for generating the timeline according to an embodiment.

FIG. 11 is a process flow diagram for message acquisition and processing according to one embodiment. FIG. 11 includes a process 2200 that starts at step 2010. The result of process 2200 is to generate the data for areas 1210-1230 of FIG. 3 and in some embodiments, the output itself, e.g. HTML code. Additionally, while process 2200 is described in a linear fashion, the process can occur in parallel with various steps occurring asynchronously and the results at step 2250 reflecting the then available information.

Step 2010 includes the identification of messages (e.g. messages 212 of FIG. 2) relating to bills. Depending on the content of the message some or all of the following three pieces of data may be missing: account number (or account identifier), amount due, and due date. In one embodiment, the web interface 1200 of FIG. 3 allows users to manually enter some or all of the missing data for a bill.

At step 2220, entries for actual bills are created, e.g. in the bills 252. Missing data may be estimated and marked as an estimate, e.g. a due date approximation could be generated by the system 120 but flagged as an estimate. For example, due date estimation in the United States for credit card type bills could be set to 21 days after the date of the email message. Other industry, or biller, type rules could be applied. For example, utility bills might be 25 days while credit cards are 21, etc. In still other embodiments, information about due dates for a given billing institution from other users' messages (or manual user entry) may inform the due date setting, e.g. other users have Chase bank credit card bills due on average 22.5 days after the email, so future Chase bank credit card bills get set to a 22 day due date vs. 21 for other credit card accounts. Additionally, it should be noted that a single bill entry may be composed from multiple messages, for example a payment alert for a past bill could be a source of amounts paid/due and due date. That could in turn drive estimations going forward.

In some embodiments, at step 2220 additional missing data, e.g. amount due, can be estimated. Many bills have highly regular recurrence amounts (sometimes with seasonal variations). This information from prior bills and payments can be used to help estimate the amount due in these embodiments.

At step 2230, de-duplication of bills is carried out. This can often be particularly helpful in the case of bills that are proxied by other providers. For example, a user may receive messages from both their credit card company and their bank's online bill payment service about the same bill. In some embodiments, de-duplication is purely automatic, e.g. based on similar due dates/amounts/account identifiers. In other embodiments, user input can identify duplicative accounts for the system. For example, a notice of a credit card bill for American Express account ending in 2001 is received from American Express. In a similar time frame, a notice is received from Bank of America that an American Express bill is ready to view for an American Express account ending in 2001. Thus, AMEX-2001 can be identified as a bill at Bank of America bill pay and that the two bills are the same bill for a single underlying account. Information from both messages can also be used to compile the timeline for that bill. If one of the two emails does not contain the account identifier, the two bills can be identified as the same based on the list of accounts that the user has with American Express as well as the dates of the two emails.

At step 2240, anticipated future bills are estimated. As seen in FIG. 8 a portion of this functionality can be exposed to users as a "crystal ball" feature. As discussed, supra, there may be two types of anticipated bills in some embodiments, e.g. manually entered vs. predicted with different display rules and practices. In one embodiment, only estimated bills within 18 days of the present date are reflected in the timeline at step 2250. Other date cutoffs could be used, but 18 strikes a useful balance for a thirty day timeline with monthly bills between the prior bill naturally "falling off" as paid and the new bill's arrival being projected.

Bill estimation at step 2240 can be done through one or more different approaches. In one embodiment a statistical approach based on computing the mean number of days between receipt of prior bills is used. In a variation of this embodiment, the data is only used if the standard deviation for the mean is sufficiently low.

In another embodiment, a matching approach using several common intervals is used. For example, in one embodiment the following common intervals are used: monthly, bi-monthly, quarterly, bi-annually, and annually. Using this approach, you compare the historically received pattern of bills (ignoring day of receipt and focusing only on month) versus the pattern and select the best match. This approach is less sensitive to small deviations in bill delivery since a bill any day in March within the tolerance is a March bill, and so on. This can be computed by looking at deviations from the same-day-next month, for example if for account X there is a bill received on March 14 and a second bill received April 17, this is considered to be exactly one month apart (13% number of days tolerance in one embodiment or +/−4 days). Then you look at the length of time in whole months between bills considered having the same day so you will have a set of integer billing intervals, e.g. (12, 3, 3, 3) (annual newspaper subscription switched to quarterly) or (7, 3) (credit card bill for an infrequently used credit card). If the GCD of the intervals is examined that can identify the billing frequency, e.g. GCD (12, 3, 3, 3)=3 vs. GCD (7,3)=1. In this embodiment there are several options if no common intervals match well: make no predictions (e.g. treat as non-recurring), treat the bill as monthly, or prompt the user for input (this could either be a blocking request, e.g. force the user to classify the bill before next display, or non-blocking, e.g. treat as non-recurring but prompt for the user to manually correct in the user interface). In some embodiments, the matching is further modified by information about the type of account, e.g. utility vs. credit card vs. property tax. In other embodiments, information about other bills of a similar nature for other users in the system can inform the matching, e.g. if most users receive this bill monthly and no pattern is matching for you, treat the bill as monthly anyhow.

In some instances, this approach can be used to predict that an account was closed, e.g. no bills on a monthly account for more than x months. Such an approximation may result in user prompts to confirm the decision or simply a removal of account from regular displays until additional messages or bills from the account arrive.

Finally, at step 2250 the information generated from the prior steps can be consolidated into the timeline view the web interface 1600 of FIG. 3. This can be done using one or more queries into a database storing the results of the prior steps of process 2200 and/or direct operation on objects generated by the prior steps. Output generation of the HTML can be done using one or more template languages or direct generation.

Conclusion and Additional Embodiments

We have now described a system and processes that afford an easy way to provide a household management system with a graphical timeline display of bills.

Some additional embodiments and features include:

- In some embodiments, the web interface 1200 may include a summary indicator highlighting the general positive vs. negative trend during the report period for balances in (versus out), e.g. using a +/−, smiley/frown, and/or other indication.
- In some instances the entries for a bill, and/or the summary area, may indicate if you are below a minimum balance requirement or over a credit limit for an account.
- In some embodiments, the system may provide timing advice on when to make payments (or how, e.g. use this rewards card to pay that bill), to avoid penalties and/or to improve cash flow by delaying payment for as long as possible.

In some embodiments, the system may provide a recommended credit card to use for an upcoming large purchase to help improve cash flow. Alternatively, the user may be able to readily deduce that by simply examining the anticipated due dates for their credit cards.

In some embodiments, the web interface 1200 provides filtering to limit the display, e.g. based on categories of bills (credit card only) and/or other criteria. Still other embodiments may allow for a longer time horizon, e.g. 60-90 days to be viewed.

In some embodiments, the web interface 1200 may provide a more compact view than the shown example with each bill on a single line with the account identifier and the associated timeline in proximity and then the next bill more closely underneath/to the side (for left-to-right scripts, in such cases the timeline might be vertically oriented as well).

Some embodiments may require payment for access to additional features, e.g. "pro" accounts vs. free accounts, or business vs. personal accounts, and/or access to certain features, e.g. ability to add custom rules.

Some embodiments may differentiate between multi-device (iOS application vs. computer web based) access, e.g. only premium account can access the data across multiple devices.

Some embodiments may offer document (e.g. bill) storage/retention capabilities for helping clip and store documents. The web document clipping described in U.S. Provisional Patent Application 61/434,508 could be used to implement this functionality.

Some embodiments may offer OCR and scraping of documents, especially scanned documents, to identify bills. For example, a (cameraphone or tablet) picture of a paper bill could be scraped to generate the manual bill entry with minimal human intervention.

As noted, in some instances the operator of the system 120 may partner with institutions for affiliate fees to encourage certain customer behaviors, e.g. go paperless/setup autopay.

Any data structures and code described or referenced, above, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A computer-implemented method for displaying a plurality of bills, each bill having a corresponding bill due date, the method comprising:

displaying using a computer, across a first web interface, an account identifier for each bill in the plurality of bills;

displaying using the computer a plurality of timelines with respective date line indicators, each timeline for a respective bill in the plurality of bills:

the date line indicator graphically representing the due date of the respective bill within the timeline, and the timeline disposed proximate to the account identifier;

wherein the plurality of timelines share a common scale and visual alignment;

for each bill, displaying using the computer an item comprised of at least one of a link and a button, the item operative to trigger the display by the computer of at least parts of an underlying bill source that caused the timeline for the respective bill to be created or operative to trigger display of a bill payment dialogue; and displaying the underlying bill source or the bill payment dialogue across a second web interface overlaid on the first web interface.

2. The computer-implemented method of claim 1, further including, for each timeline, graphical encoding of a payment status of the respective bill represented by the timeline.

3. The computer-implemented method of claim 2, wherein the graphical encoding of the payment status of the respective bill is color-coded.

4. The computer-implemented method of claim 2, wherein the graphical encoding of the payment status of the respective bill is an icon.

5. The computer-implemented method of claim 1, further including assigning a color to one of the timeline and the due date indicator, based on a condition selected from the set comprising: paid, unpaid, size of payment, and autopay set.

6. The computer-implemented method of claim 1, further including, responsive to receiving a user request, displaying a billing history for a selected account as a bar graph.

7. The computer-implemented method of claim 1, further including, in addition to displaying timelines for the plurality of bills, displaying timelines for a plurality of anticipated bills in accounts that were paid periodically in prior periods, for which no current bill has been registered.

8. A computer-implemented method of generating a display of a plurality of bills having due dates, the method including:

at a server, generating data, across a first web interface, for display of a plurality of horizontal timelines each representing a respective bill to be paid in a time period depicted by the horizontal timelines;

wherein each horizontal timeline includes a date line indicator positioned to indicate a due date of the respective bill;

wherein the horizontal timelines are aligned so that the date line indicators on respective timelines depict a time ordered sequence in which the respective bills are due to be paid;

wherein a respective account identifier is visually associated with each of the respective timeline;

for each bill, displaying using the computer an item comprised of at least one of a link and a button, the item operative to trigger the display by the computer of at least part of an underlying bill source that caused the timeline for the respective bill to be created or operative to trigger display of a bill payment dialogue;

displaying the underlying bill source or the bill payment dialogue across a second web interface overlaid on the first web interface; and transmitting the data for display to a workstation via a network.

9. The computer-implemented method of claim 8, further including, for each timeline, graphical encoding of a payment status of the respective bill represented by the timeline.

10. The computer-implemented method of claim 9, wherein the graphical encoding of the payment status of the respective bill is color-coded.

11. The computer-implemented method of claim 9, wherein the graphical encoding of the payment status of the respective bill is an icon.

12. The computer-implemented method of claim 8, further including assigning a color to one of the timeline and the due date indicator, based on a condition selected from the set comprising: paid, unpaid, size of payment, and autopay set.

13. The computer-implemented method of claim 8, further including, responsive to receiving a user request, displaying a billing history for a selected account as a bar graph.

14. The computer-implemented method of claim 8, further including, in addition to displaying timelines for the plurality of bills, displaying timelines for a plurality of anticipated bills in accounts that were paid periodically in prior periods, for which no current bill has been registered.

15. A computer-implemented method of displaying of a plurality of bills having due dates, the method including:

displaying, across a first web interface, a plurality of horizontal timelines each representing a respective bill to be paid in a time period depicted by the horizontal timelines;

wherein each horizontal timeline includes a date line indicator positioned to indicate a due date of the respective bill;

wherein the horizontal timelines are aligned so that the date line indicators on respective timelines depict a time ordered sequence in which the respective bills are due to be paid;

wherein a respective account identifier is visually associated with each of the respective timeline;

for each bill, displaying using the computer an item comprised of at least one of a link and a button, the item operative to trigger the display by the computer of at least parts of an underlying bill source that caused the timeline for the respective bill to be created or operative to trigger display of a bill payment dialogue; and displaying the underlying bill source or the bill payment dialogue across a second web interface overlaid on the first web interface.

16. The computer-implemented method of claim 15, further including, for each timeline, graphical encoding of a payment status of the respective bill represented by the timeline.

17. The computer-implemented method of claim 8, further including assigning a color to one of the timeline and the due date indicator, based on a condition selected from the set comprising: paid, unpaid, size of payment, and autopay set.

18. The computer-implemented method of claim 8, further including, responsive to receiving a user request, displaying a billing history for a selected account as a bar graph.

19. The computer-implemented method of claim 8, further including, in addition to displaying timelines for the plurality of bills, displaying timelines for a plurality of anticipated bills in accounts that were paid periodically in prior periods, for which no current bill has been registered.

* * * * *